(No Model.)
J. H. GRISWOLD.
COMBINED FRUIT PICKER AND PRUNING IMPLEMENT.
No. 491,269. Patented Feb. 7, 1893.
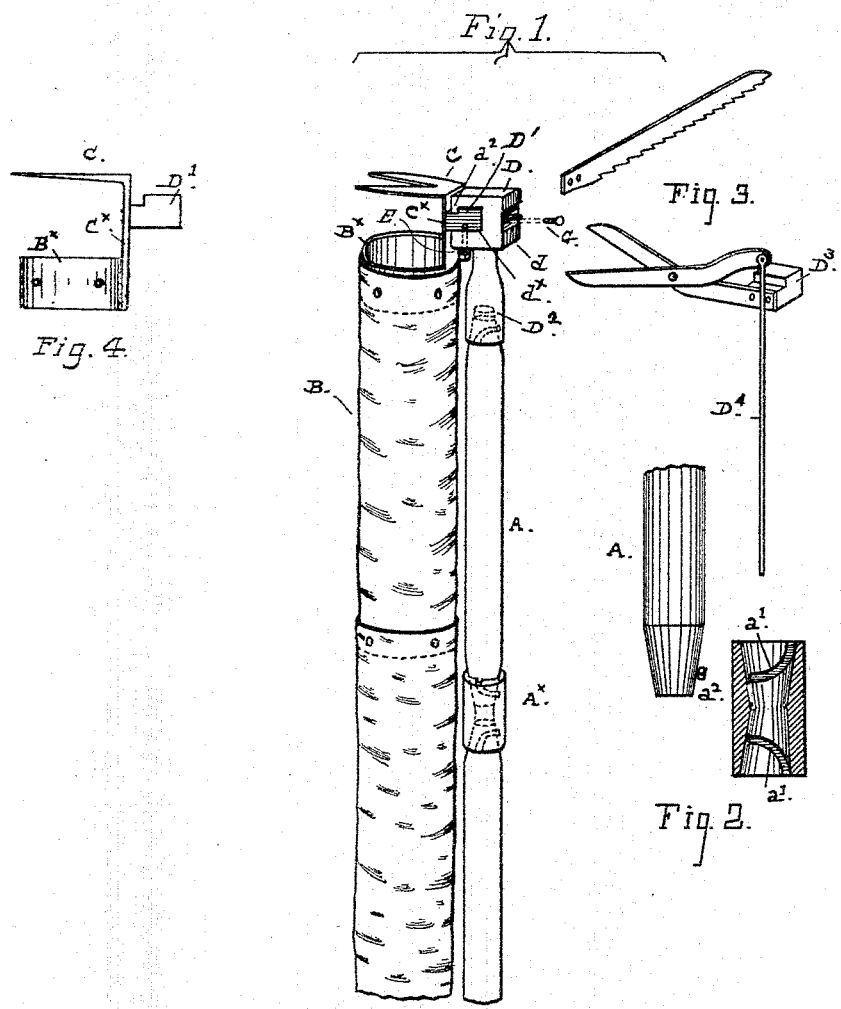
Witnesses:
Inventor:

UNITED STATES PATENT OFFICE.

JOHN H. GRISWOLD, OF OAKLAND, CALIFORNIA.

COMBINED FRUIT-PICKER AND PRUNING IMPLEMENT.

SPECIFICATION forming part of Letters Patent No. 491,269, dated February 7, 1893.

Application filed February 26, 1891. Serial No. 382,910. (No model.)

*To all whom it may concern:*

Be it known that I, JOHN H. GRISWOLD, a citizen of the United States, residing at Oakland, in the county of Alameda and State of California, have invented a Combined Fruit-Picker and Pruning Implement, of which the following is a specification.

My invention has for its object to produce a useful and handy implement that is readily convertible into a fruit picker or a pruning implement for orchard work.

To such end it consists in the construction and combination of parts hereinafter described and illustrated in the accompanying drawings.

In one form of adjustment the implement consists of a pole carrying a fruit pulling or cutting device on the upper end, and a long tubular chute or tube of cloth to receive and convey the fruit to the ground from the point where it is severed from the stem. In the other form this device is unshipped and a pruning hook, or shears, and a saw are secured to the end of the pole when that implement is used.

Figure 1 represents in perspective the top portion and a part of the next section of my improved implement with the picker in position and the saw detached. Fig. 2 shows in detail and in section the coupling for the pole sections. Fig. 3 is a perspective view of the shears especially constructed for this implement. Fig. 4 is a side view of the fruit picking attachment.

A indicates a pole composed of two or more sections united by couplings A* for convenience in carrying the implement and for regulating the length of the pole to the work to be done. The coupling is formed of a sleeve with tapering sockets in the ends and spiral grooves or slots $a'$ to take pins or studs $a^2$ on the pole sections which are tapered to fit the coupling. This coupling is readily fitted to pole sections of different lengths.

B is a tubular chute made of light canvas, or cotton cloth, or any suitable fabric, of suitable diameter to pass the fruit easily through it, and B* is a ring, or band, on the upper end that serves to hold the mouth of the tube open. The tube is made in sections joined together by suitable fastenings such as hooks and eyes, or buttons and button holes, so that its length can be increased or reduced, the end of one tube section being shaped to slip over the corresponding end of the next section. However the handle and tube may be made in sections adapted to be connected in any other suitable manner, or they may be each of one piece without departing from the spirit of the present invention. On the rim B* is fixed a stem cutter or puller C, having a forked end with a V-shaped slot to take in the stem of the fruit and a shank, or upright portion, $c^*$ which is attached to the rim B*. The cutter is set above and over the mouth by the chute at suitable distance to bring the rim below the fruit when the prongs are passed around the stem, and the inner edges of the prongs at the bottom of the slot are beveled, or suitably sharpened when necessary to use a cutter. Stems of fruit that part readily from the bough will not require those edges of the prongs to be sharpened.

D is a block fixed permanently on a half coupling $D^2$ at the top end of the pole, having on one side a flat face $d$, and on the opposite side a slot or groove $d^*$, with a clamp screw E taking upwardly through its lower wall. D' is a clamp-piece which slides into the slot in the block from the end thereof, and is confined by the overhanging lip $d^2$ from above the slot and the screw from below it. A clamp G is provided on the back of the block to take the pruning saw, when the picker and chute are detached and the shears are substituted.

The clamp D is adapted to receive the handle of a pruning hook, or one part of the handle of a pair of pruning shears, the other portion of the handle being worked by a cord or wire from the ground.

A pair of pruning shears specially formed for this implement will have a block $D^3$ fixed on the lower handle as illustrated in Fig. 3 and a cord or wire $D^4$ attached to the upper lever for working them.

Having thus fully described my invention, what I claim and desire to secure by Letters Patent, is—

1. The herein described pruning and fruit-picking implement, the same consisting of a handle, a head carried thereby and having a lateral groove in one side with an overhanging lip, and a set screw passing upwardly into said groove; combined with a tool substantially as specified, and a block secured to said tool and of a shape to closely fit said groove in the head, as and for the purpose set forth.

2. The herein described pruning and fruit-picking implement, the same consisting of a handle, a head carried thereby and having a lateral groove in one side with an overhanging lip, a clamp on the other side of the head, and a set screw passing upwardly into said groove; combined with a cutting tool detachably secured to the head by said clamp, pruning and picking tools substantially as specified, and blocks secured to each of said latter tools and of a shape to closely fit said groove in the head, as and for the purpose set forth.

In testimony that I claim the foregoing I have hereunto set my hand and seal.

JOHN H. GRISWOLD. [L. S.]

Witnesses:
JAMES L. KING,
EDWARD E. OSBORN.